(12) United States Patent
McKenzie

(10) Patent No.: US 6,974,539 B1
(45) Date of Patent: *Dec. 13, 2005

(54) COMBINATION FILTER ELEMENT SUPPORT AND ANTI-PREFILL VALVE

(75) Inventor: Darrell T. McKenzie, Gastonia, NC (US)

(73) Assignee: Wix Filtration Corp., Gastonia, NC (US)

( * ) Notice: Subject to any disclaimer, the term of this patent is extended or adjusted under 35 U.S.C. 154(b) by 336 days.

This patent is subject to a terminal disclaimer.

(21) Appl. No.: 09/965,806

(22) Filed: Oct. 1, 2001

(51) Int. Cl.[7] .............................................. B01D 27/10
(52) U.S. Cl. ...................... 210/136; 210/430; 210/443; 210/DIG. 17; 137/846
(58) Field of Search ....................... 210/136, 117, 430, 210/440, 443, DIG. 17; 137/846, 511, 843

(56) References Cited

U.S. PATENT DOCUMENTS

| | | | |
|---|---|---|---|
| 3,369,666 A | 2/1968 | Hultgren et al. | |
| 3,567,023 A | * 3/1971 | Buckman et al. | ........... 210/130 |
| 3,802,564 A | 4/1974 | Turman | |
| 4,524,805 A | 6/1985 | Hoffman | |

* cited by examiner

*Primary Examiner*—Terry K. Cecil
(74) *Attorney, Agent, or Firm*—Berenato, White & Stavish

(57) ABSTRACT

A combined filter element support and anti-prefill valve is used with an annular filter element having an annular filter media with a hollow core for filtering lubricating oil or fuel. The combined filter element includes a unitary body having an annular portion, wherein the annular portion has annular shoulder extending radially therefrom for supporting the filter element, and a sealing section which engages the end plate over a continuous location which is coaxial with the central spin-on opening. The unitary body has a radially extending plate portion having an axially positioned one-way valve unitary therewith, which valve opens in an axial direction toward the spin-opening. In a preferred embodiment, the one-way valve is configured by a pair of lips which normally abut along a line and separate when subjected to oil or fuel pressure.

11 Claims, 3 Drawing Sheets

US 6,974,539 B1

COMBINATION FILTER ELEMENT SUPPORT AND ANTI-PREFILL VALVE

RELATED APPLICATION

This application is related to U.S. patent application Ser. No. 09/965,805, filed Oct. 1, 2001, filed on even date herewith, entitled "Three Valve Filter Element Support for Filter Cartridge," and incorporated herein by reference in its entirety.

FIELD OF THE INVENTION

The present invention is directed to a filter element support and anti-prefill valve. More particularly, this invention is directed to a combination filter element support and anti-prefill valve for use with liquid filters, especially lubrication oil or fuel filters used with internal combustion engines.

BACKGROUND OF THE INVENTION

Filter cartridges include valves which perform several functions such as a bypass function when the filter media becomes clogged and an anti-drainback function to prevent oil from leaving the filter cartridge when the engine with which the filter cartridge is connected is not running. An additional need is to provide a clean side valve which prevents drainback of clean fluid from an installed filter cartridge. There is another need because filter installers occasionally fill a new filter cartridge with unfiltered oil or fuel prior to installation of the new filter cartridge.

During manufacture, when dispirate parts are matched, the risk of failure is increased because one of the parts may be of inferior quality and adversely effect the reliability of the entire assembly. It is frequently time consuming and therefore costly to assemble the plurality of elements in order to configure an item reliably. Consequently, utilizing only a single element can then be advantageous. This is especially the case with mass produced items such as filters for engine lubricating oil which are manufactured by the millions.

SUMMARY OF THE INVENTION

In view of the aforementioned considerations, the present invention is directed to a combination filter element support and anti-prefill valve for use with an annular filter element having an annular filter media with a hollow core and disposed within a housing. The housing is closed by an end plate having a central spin-on outlet opening and a plurality of spaced, radially disposed inlets. The combination filter element support and anti-prefill valve comprise a unitary body having an annular portion having an annular shoulder extending radially therefrom for supporting the filter element and a sealing section which engages the end plate over a continuous location which is coaxial with the central spin-on outlet opening. The unitary body further includes a radially extending plate portion having an axially positioned one-way valve unitary therewith. The one-way valve opens in an axial direction toward the spin-on outlet opening. The one-way valve closes to prevent oil from flowing through the central spin-on opening into the hollow core of the filter element and opens when oil or fuel is being circulated through the filter element under pumping pressure.

In a more specific aspect, the one-way valve is a purse valve comprising lips which intersect along a line. The lips project away from the hollow core of the filter media and are biased together at the line, wherein fluid pressure in the hollow core separates the lips along the line to open the one-way valve and wherein fluid pressure outside of the filter element applied against the lips urges the lips into engagement along the line to close the one-way valve.

In still a more specific aspect, there are two lips joined by web portions which flex allowing the lips to part along the line providing an opening through which the fluid flows.

In still a further aspect of the invention, the radially extending plate portion which has the one-way valve unitary therewith is disposed in spaced relation to the annular shoulder at an end of the annular portion opposite the sealing section.

In still a more specific aspect of the invention, the unitary body is made of rubber or another suitable flexible resilient material.

This invention is also directed to the combination filter element support and anti-pre-fill valve discussed above in combination with a filter canister having housing closed by an end plate having therein the central spin-on outlet opening and plurality of spaced, radially disposed inlets, and further including an annular filter media having a hollow core disposed within the housing between the outlet opening and the plurality of spaced, radially disposed inlets.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
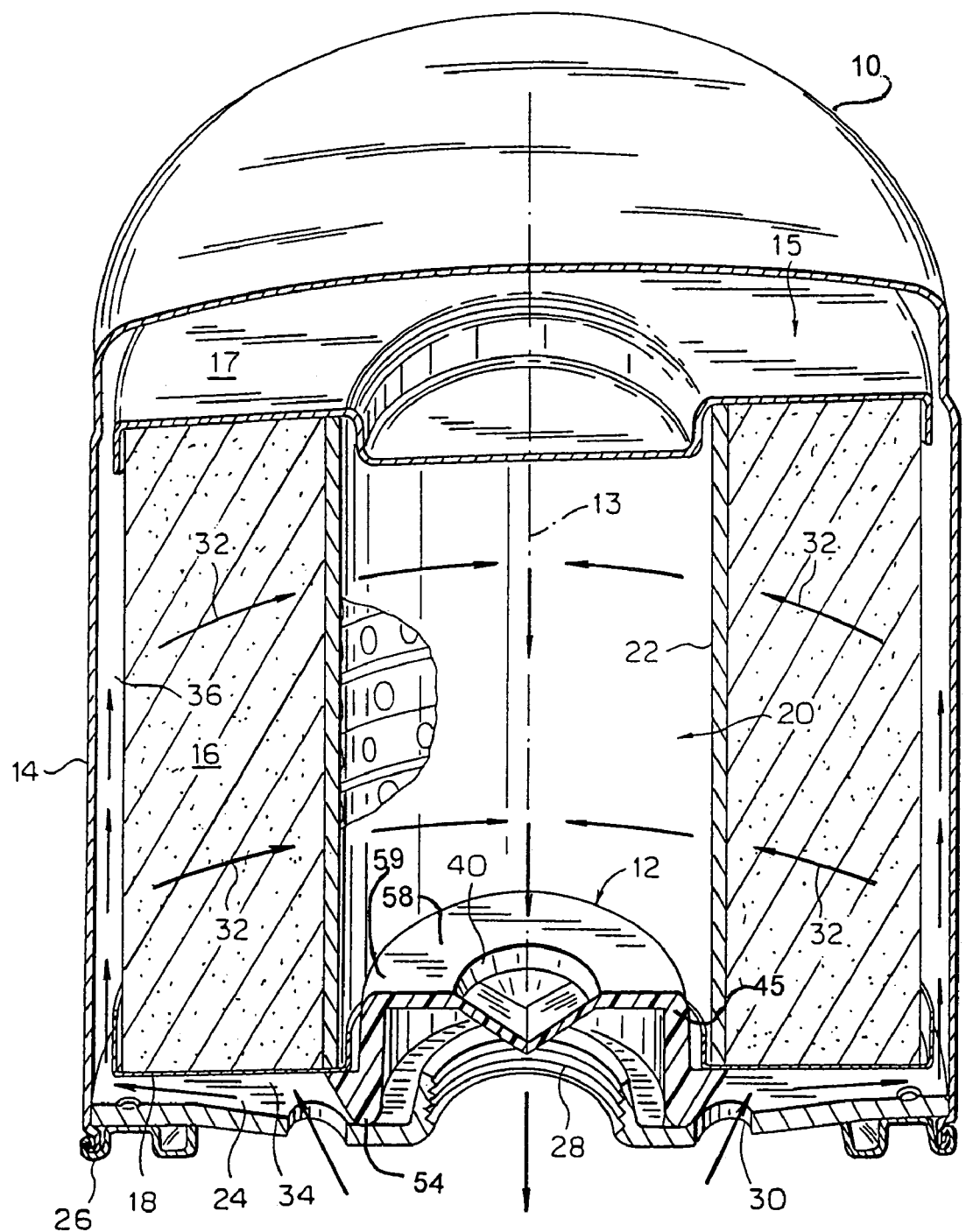
FIG. 1 is a perspective view, partially in elevation showing a filter element support and anti-prefill valve in combination with a filter cartridge.

Referring now to FIG. 1, there is shown filter cartridge 10 having a filter element support with a unitary anti-pre-fill valve 12 configured in accordance with the principles of the present invention. The filter cartridge 10 and the filter element support with anti-pre-fill valve 12 each include elements which are annular with respect to a central axis 13. While the filter cartridge 10 finds its primary use as a filter for internal combustion engine lubricating oil, it has other uses where the fluid being filtered is a liquid.

As is seen in FIG. 1, the filter cartridge 10 includes a housing 14 having a filter element 15 therein, wherein the filter element 15 includes a filter media 16 which is disposed between a pair of end caps 17 and 18. The annular filter media 16 defines a hollow core 20 and is supported on its inner annular surface by a perforated cylindrical support 22.

The housing 14 is closed by a base plate 24 which is retained in position by a cover 26 that is crimped to the wall of the housing 14. The base plate 26 has a central spin-on opening 28 which is internally threaded and a plurality of radially positioned spaced openings 30. The filter element support 12 provides a barrier which separates the spaced radial openings 30 from the central spin-on opening 28. Accordingly, when the spaced radial openings 30 are inlet openings, the liquid flows in the direction of arrows 32 into a space 34 between the end cap 18 and end plate 24 and then into an annular space 36 between the filter media 16 and the housing wall. The liquid then flows through the filter media 16 into the hollow core 20 and out through a one-way valve 40 in the filter element support 12. Since the valve 40 is in communication with the central opening 28, the fluid returns to the engine.

Figure 2:
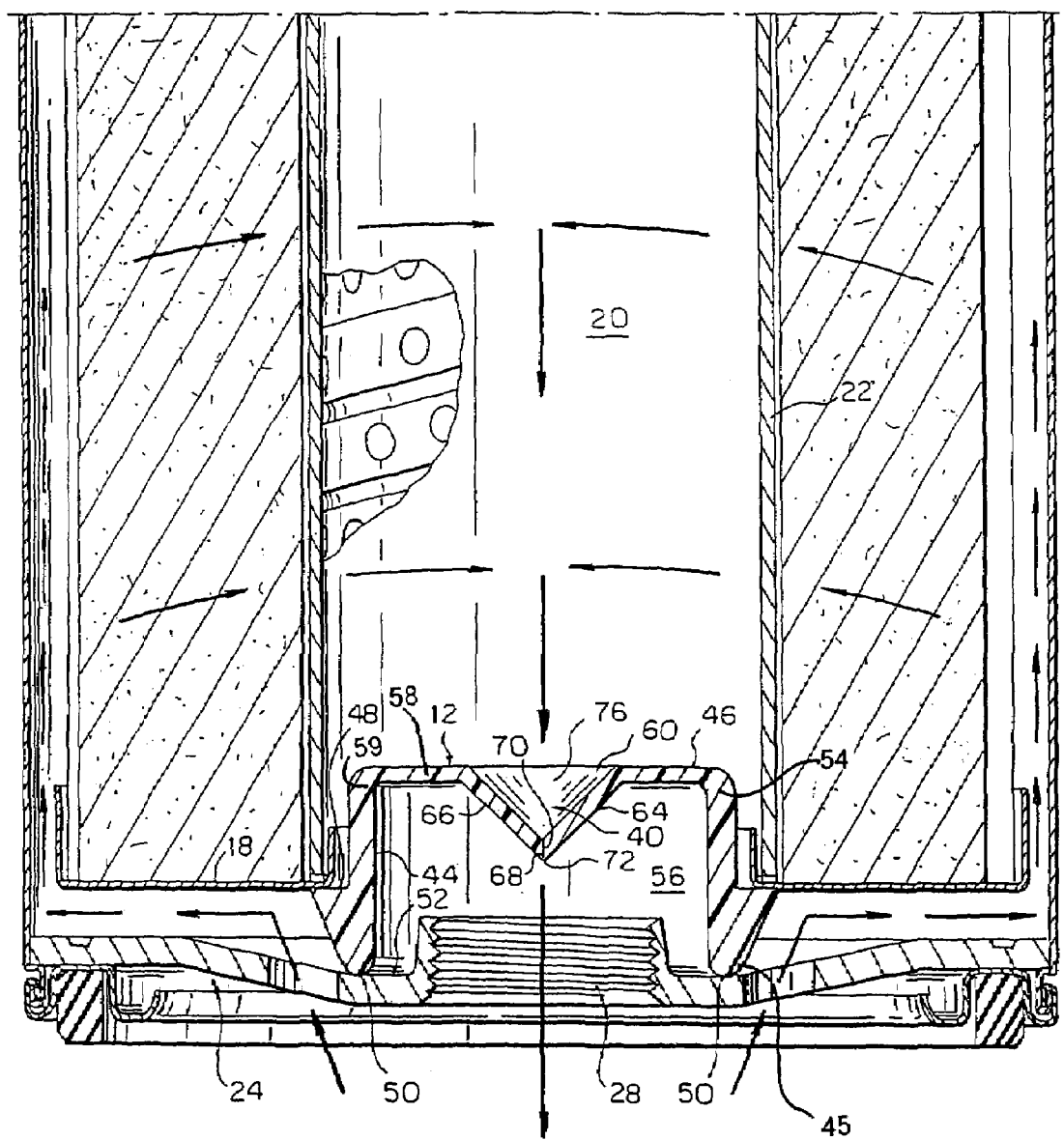
FIG. 2 is a side elevation of a portion of FIG. 1.

As is seen in FIG. 2, the filter element 12 has an annular portion 44 and a radial plate portion 46. The annular portion 44 has at a first end 45 thereof an exteriorly facing annular shoulder 48 and an annular sealing surface 50. The annular sealing surface 50 engages the end plate 24 at a location 52 on the end plate between the threaded central opening 28 and the plurality of radially positioned spaced openings 30 to isolate the central opening from the radially positioned openings.

On the shoulder 48 rests the end cap 18 of the filter element 15. The filter element 15 is urged into engagement with the shoulder 48, a spring element (not shown) such as a coil spring which engages the top end cap 17 (FIG. 1). In order to stabilize the assembly, the annular portion 44 of the filter element support 12 extends up into the hollow core 20 of the filter media 16.

Radially extending plate portion 46 which has the one-way valve 40 thereon is at a second end 54 of the annular portion 44 opposite the sealing surface 50 and extends completely across the annular portion 44 to define a chamber 56 which communicates with the threaded central opening 28. The chamber 56 has an axial depth sufficient to accommodate the depth of the one-way valve 40. The plate portion 46 has a web portion 58 and a peripheral portion 59. The plate portion 46 is supported only at the peripheral portion 59 thereof on the second end 54 of the annular portion 44.

Figure 3:
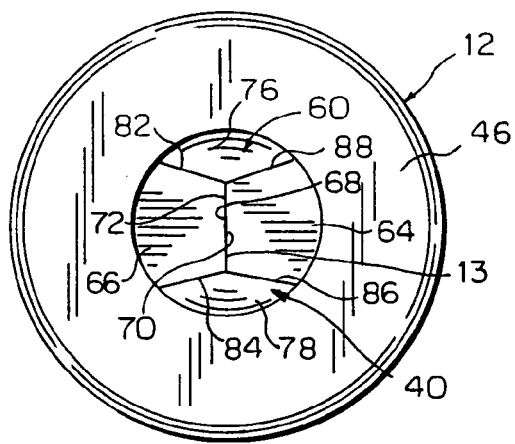
FIG. 3 is a top view of filter element support and anti-prefill valve, showing the anti-prefill valve closed.
Figure 4:
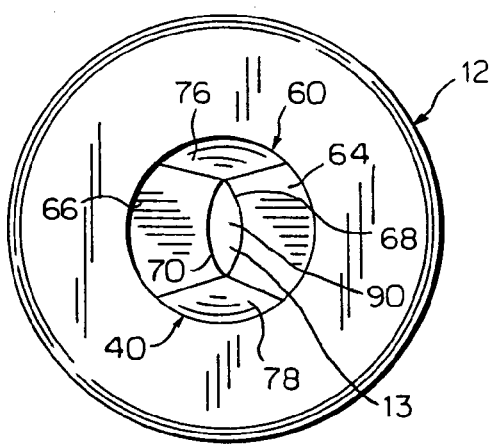
FIG. 4 is a view similar to FIG. 3 but showing the anti-prefill valve open.

As is best seen in FIGS. 3 and 4, the one-way valve 40 is formed in a circular indentation 60 which is coaxial with the axis 13 of the filter element support 12. As is seen in FIG. 3, a pair of lips 64 and 66 have free edges 68 and 70 which intersect along the line 72. The lips 64 and 66 join a pair of side webs 76 and 78 at fold lines 82, 84, 86 and 88. As is seen in FIG. 4, upon pressure being exerted in the hollow core 20, edges 68 and 70 of the lips 64 and 66, respectively separate to form an oval shaped opening 90. This is because as the free edges 68 and 70 form into arcuate shapes (FIG. 4), the webs 76 and 78 deform inwardly as seen in FIG. 3 under pressure within the hollow core 20. The liquid within hollow core 20, such as lubricating oil or fuel then flows through the aperture 90 and central spin-on opening back to the engine for recirculation.

One-way valve 40 forms two functions, one of which is to retain clean side fluid within the hollow core 20 of the filter element 10 and the other of which is to prevent an unscrupulous filter installer from filling filter cartridges with used or unfiltered oil or fuel during a filter change. If an attempt is made to fill the cartridge 10 by pouring used or unfiltered oil or some other fluid into the filter cartridge, one-way valve 40 remains shut. Since the access to the one-way valve 40 is through the small central opening 28 in the end plate 18, it is difficult to deflect the edges 68 and 70 of the lips 64 and 66 respectively from outside the filter cartridge 10 so as to create the opening 90. Accordingly, the temptation to refill new filter cartridges with used or unfiltered oil or fuel is minimized.

From the foregoing description, one skilled in the art can easily ascertain the essential characteristics of this invention, and without departing form the spirit and scope thereof, can make various changes and modifications of the invention to adapt it to various usages and conditions.

What is claimed is:

1. A combination filter element support and anti-prefill valve for use with an annular filter element having an annular filter media with a hollow core and disposed within a housing, wherein the housing is closed by an end plate having a central spin-on outlet opening and a plurality of spaced radially disposed inlets, the combination comprising:

a unitary body having an axially extending annular portion, wherein the annular portion has at one end an annular shoulder extending radially therefrom for supporting the filter element and a sealing section which engages the end plate over a continuous location which is coaxial with the central spin-on opening, the unitary body being of a single piece, and the unitary body including a radially extending plate portion defined by a web portion and a peripheral portion, at a second end of the annular portion the plate portion being supported in spaced relation to the end plate only at the peripheral portion of the plate portion, the web portion having an axially positioned one way valve unitary therewith which opens in an axial direction toward the spin-on opening, the one way valve closing to prevent oil or fuel from flowing through the central spin-on opening and into the hollow core of the filter element and opening when fluid is being circulated under pumping pressure.

2. The combination of claim 1 wherein the annular portion is extends axially into the hollow core.

3. The combination of claim 1 wherein the one way valve is a purse valve comprising lips which intersect along a line, the lips projecting away from the hollow core and being biased together at the line, whereby fluid pressure in the hollow core separates the lips along the line to open the one way valve and fluid pressure outside of the filter element applied against the lips urges the lips into engagement along the line to close the one way valve.

4. The combination of claim 3 wherein there are two lips, the two lips being joined by web portions which flex, allowing the two lips to part along the line providing an opening through which the fluid flows.

5. The combination of claim 4 wherein the radially extending plate portion is disposed in spaced relation to the annular shoulder at an end of the annular portion opposite the sealing section to define a chamber for receiving the one way valve.

6. The combination of claim 5 wherein the unitary body is made of rubber.

7. The combination of claim 6 wherein the filter element support and anti-prefill valve are in further combination with a filter cartridge having the annular filter element therein and wherein the annular filter media is a media for filtering engine lubricating oil or fuel.

8. The combination of claim 3 wherein the filter element support and anti-prefill valve are in further combination with a filter cartridge having the annular filter element therein and wherein the annular filter media is a media for filtering engine lubricating oil or fuel.

9. The combination of claim 1 wherein the filter element support and anti-prefill valve are in further combination with a filter cartridge having the annular filter element therein and wherein the annular filter media is a media for filtering engine lubricating oil or fuel.

10. The combination of claim 1 wherein the radially extending plate portion is disposed in spaced relation to the annular shoulder at an end of the annular portion opposite the sealing section to define a chamber for receiving the one way valve.

11. The combination of claim 1 wherein the unitary body is made of rubber.

* * * * *